Nov. 22, 1966 E. RING 3,286,876

CONTAINERS

Filed June 15, 1964

INVENTOR.
EUGENE RING

BY
J.B. Holden
ATTORNEY

United States Patent Office 3,286,876
Patented Nov. 22, 1966

3,286,876
CONTAINERS
Eugene Ring, Clinton, Ohio, assignor to Goodyear Aerospace Corporation, Akron, Ohio, a corporation of Delaware
Filed June 15, 1964, Ser. No. 375,234
8 Claims. (Cl. 220—73)

This invention relates to an improved container. More particularly, this invention relates to a method of reinforcing a glass fiber container.

Polyester impregnated glass fiber containers have received considerable commercial acceptance, especially is this true where the polyester impregnated glass fiber containers have been used for meat bins by the packing houses. Recently these polyester impregnated glass fiber containers have come under considerable criticism by The Pure Food & Drug Administration because of cracks in the surface of the container which increases the difficulty of sterilizing the containers. Although it was possible to reinforce the polyester impregnated glass fiber containers in those areas where cracks were appearing by increasing the thickness of the polyester impregnated glass fiber container, this was found to be unsatisfactory because it added appreciably to the weight and yet the containers would develop microscopic cracks during transit from the meat packing plant to the consumer and thus increase the difficulty of sterilizing the containers.

Figure 1:
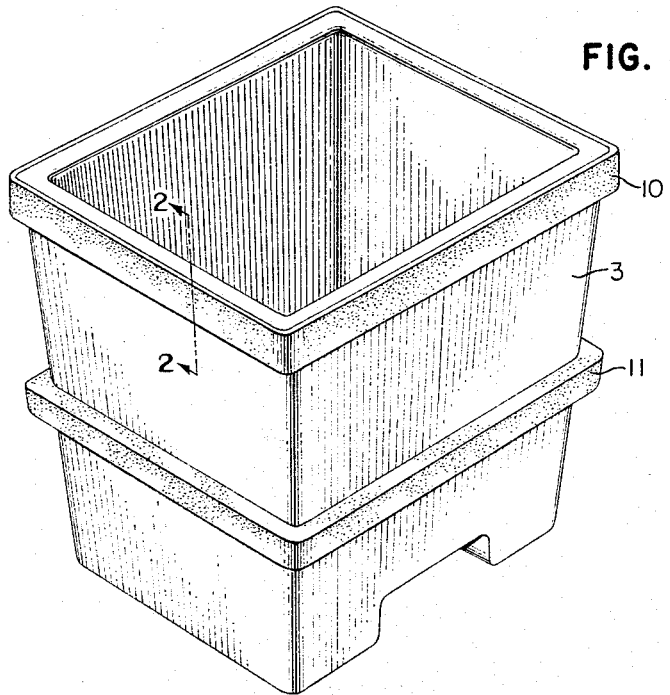
Figure 2:
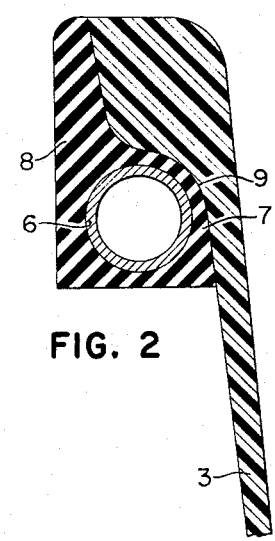
Figure 3:
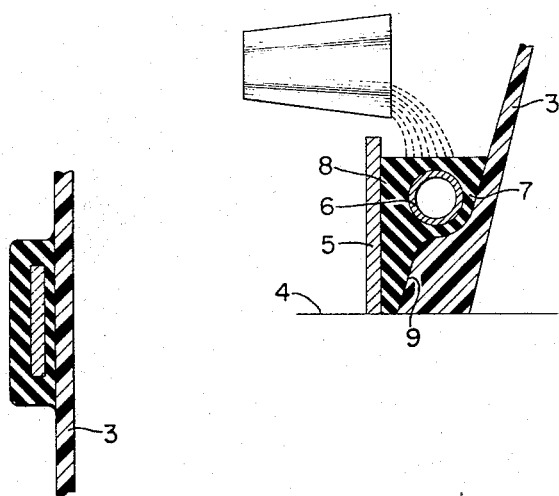
Figure 4:

It is an object of this invention to provide a reinforcing element for the polyester impregnated glass fiber containers which is able to absorb the shocks occasioned by shipping. This object and other advantages of this method of reinforcement may be further illustrated by reference to the drawings wherein Fig. 1 is a perspective view of the glass fiber impregnated open container having at least one reinforcing strip around its outer periphery. Fig. 2 is a partial cross section of Fig. 1 along the lines 2—2. Fig. 3 is a partial cross section along the lines 2—2 of Fig. 1 showing a glass fiber thermoset resin impregnated container in an inverted position with a retaining member placed in position to form a mold cavity into which the liquid polyurethane reaction mixture is poured to form the reinforcing element. Fig. 4 is another cross sectional view through Fig. 1 showing another embodiment of the reinforcing member 11.

The polyester impregnated glass fiber bin or container 3 of the desired shape is formed in usual manner by laying up the glass fiber, preferably as a mat within a suitable mold and impregnating the glass fiber with a suitable polyester and then subjecting the polyester impregnated glass fiber or rock wool material within the mold to sufficient pressure to give essentially a smooth surface appearance to the finished container. It should suffice to indicate that adjustment of the temperature during the mold pressing may be necessary to cause the polyester to penetrate the glass fiber mats, and to thermally set the polyester resin. Once the finished polyester impregnated glass fiber container is removed from the mold, it is then ready to have the reinforcing member applied thereto.

This step may best be understood by reference to Fig. 3 which shows the bin turned bottom side up and resting on a flat surface 4 and having the retaining wall 5 positioned as shown in Fig. 3. Either prior to the placing of the retaining wall 5 in the position shown in Fig. 3 or afterwards a light aluminum or other suitable metal conduit 6 is bent around the container to give a metal reinforcing member having essentially the contour of the container except it is preferably displaced a short distance, 0.06 to 0.5 inch, from the walls of the container as shown by the numeral 7 in Fig. 3 and then is imbedded in an elastomer having a Shore A hardness of about 30–95, and preferably 50–70. The preferred distance from the wall is about 0.125 to 0.25 inch depending on the size of the bin. The metal conduit 6 is preferably welded or otherwise connected to give a closed band with the metal conduit in the position shown in Fig. 3.

A suitable casting composition such as liquid polyurethane reaction mixture is poured around the metal conduit and reacted to give a polyurethane elastomeric reinforcing element 8 having the configuration shown in the cross section of Figs. 2 and 3. When the polyurethane casting composition has set and cured the retaining wall 5 may be removed and then the bin may be turned upright and is ready for service. It should be noted that the surface 4 may need to be coated with polyurethane releasing agent such as a mineral wax or polyethylene to prevent the polyurethane casting composition from adhering thereto. Also in practice it is found that better adhesion of the polyurethane casting composition to the polyester of the container is obtained where the surface 9 of the polyester container has been polished by suitable abrasion means.

Where the container is to be subjected to extremely severe conditions and heavy loading, it is preferred that the container contain a reinforcing strip 10 around the top of the container and also one 11 in the intermediate portion of the container as shown in Fig. 1. The reinforcing members 10 and 11 in one embodiment may be a flat metal band rather than the metal conduit shown in Figs. 2 and 3.

The liquid polyurethane reaction mixtures useful for casting to imbed the metal reinforcing element when the elastomeric reinforcing means may be prepared by forming a reaction mixture. The reaction mixture may be formed by either the 1-step or 2-step method. In the 1-step method the reactive hydrogen containing material of about 700–4000 molecular weight is mixed with an excess of an organic polyisocyanate and sufficient amounts of cross linking agent to react with at least some of the excess polyisocyanate over that equivalent to the reactive hydrogen containing polymeric material. In the 2-step method the reactive hydrogen containing polymeric material and the organic polyisocyanate are first reacted to form a prepolymer and then the crosslinking agent is added.

The reactive hydrogen containing material may be selected from the class consisting of polyester polyols, polyether polyols, polyester amides and hydroxyl terminated polymeric hydrocarbons.

Representative examples of the polyesters are those reaction products formed by the condensation to eliminate water between the monomeric glycols having from 2 to about 10 carbon atoms and the aliphatic dicarboxylic acids or the aromatic dicarboxylic acids. It is also known and should be appreciated that the use of trifunctional monomeric polyols or carboxylic acids may be used in small or relatively large amounts if desired.

Representative examples of the polyether polyols are those condensation products obtained by the polymerization of alkylene oxides having from 2 to about 10 carbon atoms where the condensation usually occurs on a nucleous generating material such as a glycol, other monomeric polyols, carboxylic acids and related compounds.

Representative examples of the hydroxyl terminated hydrocarbon are the reaction products obtained by the polymerization of a diene such as butadiene or isoprene with lithium metal to form a lithium adduct and then hydroxyl terminating the lithium adduct by reacting with an alkylene oxide such as ethylene oxide or propylene oxide.

Any of a wide variety may be employed to prepare the polymers useful in this invention including aromatic, aliphatic and cycloaliphatic diisocyanates and mixtures of two or more of these.

Representative compounds include 2,4-toluene diisocyanate and 2,6-toluene diisocyanate and mixtures of these; phenylene diisocyanate; 4,4'-diphenylene diisocyanate; 4,4'-diphenylene methane diisocyanate; dianisidine diisocyanate; 4,4'-tolidine diisocyanate; 4,4'-diphenyl ether diisocyanate; 1,6-hexamethylene diisocyanate.

Normally the isocynates will be used in excess relative to the reactive hydrogen containing material with the excess being from about 1.1 mols and up to about 2.5 mols for each mol of reactive hydrogen containing material.

The amount of crosslinker used may be equivalent to the excess isocyanate of that required to react with the reactive hydrogen containing material. The amount of crosslinker used will be about 0.4 to 0.9 mols per mol of reactive hydrogen containing material.

Representative examples of the crosslinkers are the monomeric polyols, organic diamines and amino alcohols. Representative examples of the monomeric polyols are ethylene, propylene and butylene glycol with butylene glycol being preferred.

Representative examples of the diamines are ortho dichloro benzidine, methylene bis chloroaniline and bis amino phenol sulfone.

The polyesters useful to impregnate the glass fibers are those which are thermosetting and representative examples are the mixed esters of ethylene glycol, and a mixture of saturated and unsaturated carboxylic acid. These polyesters are cured by heating with a peroxide such as benzyl or other suitable polymerization catalysts to give a thermoset plastic material.

Representative examples of these carboxylic acids are the saturated ones such as phthalic, isophthalic, terephthalic acid and the unsaturated ones such as maleic acid and fumaric acid. Small amounts of unsaturated materials such as styrene may be used to reduce the viscosity of the polyester.

Representative examples of a bin constructed in accordance with this invention is made by laying up of a glass fiber mat within a mold of the configuration of the bin in Fig. 1 and then saturating the mat with a polyester prepared by esterification of ethylene glycol with a mixture of about 80% phthalic acid and 20% maleic acid, said polyester being thinned with about 5 to 10% styrene by weight and containing 5% silica and 2% by weight of benzyl peroxide. Then the laid-up polyester saturated glass fiber mat is subjected to a press cure at about 250°F. for at least about 5 minutes, after which the bin or container is removed from the mold. The bin is then sanded in the flange area 9, best seen in Figs. 2 and 3, and the retaining wall or mold 5 is placed in position as shown in Fig. 3. The cavity 8 in the mold is filled with a liquid polyurethane mixture comprising 100 parts of a prepolymer and 11 parts of methylene bis chloroaniline. The prepolymer was formed by reacting 2094 parts of a commercial toluene diisocyanate with a mixture of 4000 parts of a polypropylene ether diol of 1000 molecular weight with 4000 parts of a polypropylene ether diol of 2000 molecular weight.

Instead of a thermosetting polyester an epoxy resin may be used to impregnate the glass fiber of the container and then the polyurethane reinforcing member can be formed and attached in manner described above.

While certain representative embodiments and details have been shown for the purpose of illustrating the invention, it will be apparent to those skilled in this art that various changes and modifications may be made therein without departing from the spirit or scope of the invention.

What is claimed is:

1. An improved glass fiber thermoset resin impregnated container having at least one reinforcing member extending around its periphery, said reinforcing member comprising a metal member encircling said periphery and imbedded in an elastomeric polyurethane, said elastomeric polyurethane being adhered to the thermoset resin of the glass fiber forming the container.

2. The container of claim 1 wherein the elastomeric polyurethane has a Shore A hardness of about 30 to 95.

3. The container of claim 1 wherein the elastomeric polyurethane has a Shore A hardness of about 50 to 70.

4. The container of claim 1 wherein the elastomeric polyurethane is the reaction product of a reactive hydrogen containing polymeric material of about 700 to 4000 molecular weight with an excess of an organic polyisocyanate and sufficient crosslinking agent to be essentially equivalent to the excess organic polyisocyanate over the reactive hydrogen containing polymeric material.

5. The container of claim 4 wherein the thermoset resin is a polyester.

6. The container of claim 1 wherein the thermoset resin is an epoxy.

7. The container of claim 1 wherein the metallic ring of the reinforcing element is positioned at least 0.06 inch away from the glass fiber thermoset resin impregnated container.

8. An improved glass fiber polyester impregnated container having at least one reinforcing member extending around its periphery, said reinforcing member comprising a continuous metal imbedded in elastomeric polyurethane, said elastomeric polyurethane being adhered to the polyester of the glass fiber forming the container.

References Cited by the Examiner

UNITED STATES PATENTS

| 2,676,729 | 4/1954 | Neville et al. | 220—73 |
| 3,092,284 | 6/1963 | Stout | 220—21 |

FOREIGN PATENTS

| 704,382 | 2/1965 | Canada. |
| 1,149,292 | 5/1963 | Germany. |
| 353,866 | 6/1961 | Switzerland. |

THERON E. CONDON, *Primary Examiner.*

JAMES R. GARRETT, *Examiner.*